United States Patent
Erdmann et al.

(10) Patent No.: US 10,606,802 B2
(45) Date of Patent: Mar. 31, 2020

(54) CATALOG BACKUP AND RECOVERY USING LOGICAL MIRRORING

(71) Applicant: International Business Machines Corporation, Armonk, NY (US)

(72) Inventors: Derek L. Erdmann, Tucson, AZ (US); Eric J. Harris, Vail, AZ (US); Franklin E. Mccune, Tucson, AZ (US); Thomas C. Reed, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 96 days.

(21) Appl. No.: 15/595,681

(22) Filed: May 15, 2017

(65) Prior Publication Data

US 2018/0329919 A1 Nov. 15, 2018

(51) Int. Cl.
*G06F 17/30* (2006.01)
*G06F 11/14* (2006.01)
*G06F 16/11* (2019.01)
*G06F 11/20* (2006.01)

(52) U.S. Cl.
CPC ........ *G06F 16/128* (2019.01); *G06F 11/1435* (2013.01); *G06F 11/1446* (2013.01); *G06F 11/1458* (2013.01); *G06F 11/1461* (2013.01); *G06F 11/1451* (2013.01); *G06F 11/1469* (2013.01); *G06F 11/2056* (2013.01); *G06F 2201/84* (2013.01)

(58) Field of Classification Search
USPC .................. 711/114, E12.001, E12.103, 162
See application file for complete search history.

(56) References Cited

U.S. PATENT DOCUMENTS

| | | | | |
|---|---|---|---|---|
| 5,546,533 A | * | 8/1996 | Koyama | G06F 11/1435 714/5.1 |
| 6,721,901 B1 | | 4/2004 | McBrearty et al. | |
| 7,216,133 B2 | | 5/2007 | Wu et al. | |
| 7,356,493 B2 | | 4/2008 | Choi et al. | |
| 8,819,362 B1 | * | 8/2014 | Duprey | G06F 11/2069 711/161 |
| 8,918,400 B2 | | 12/2014 | Belisle et al. | |
| 9,063,994 B1 | | 6/2015 | Natanzon et al. | |
| 2004/0010487 A1 | * | 1/2004 | Prahlad | G06F 11/1435 |
| 2005/0187990 A1 | * | 8/2005 | Pace | G06F 16/10 |
| 2005/0273654 A1 | * | 12/2005 | Chen | G06F 11/2082 714/13 |

(Continued)

OTHER PUBLICATIONS

IBM, "What is a Catalog," 2010, pp. 1-3, Retrieved From https://www.ibm.com/support/knowledgecenter/zosbasics/com.ibm.zos.zconcepts/zconcepts_172.htm.

(Continued)

*Primary Examiner* — Tuan V Thai
*Assistant Examiner* — Edward Waddy, Jr.
(74) *Attorney, Agent, or Firm* — Zilka-Kotab, P.C.

(57) ABSTRACT

A computer-implemented method according to one embodiment includes intercepting one or more updates made to a catalog data set, storing the one or more updates in an update buffer, retrieving the one or more updates from the update buffer, sequentially applying the one or more updates to a backup catalog data set, identifying a request to replace the catalog data set, and replacing the catalog data set with the backup catalog data set, in response to the request.

17 Claims, 5 Drawing Sheets

(56) References Cited

U.S. PATENT DOCUMENTS

| | | | |
|---|---|---|---|
| 2006/0236151 A1 | 10/2006 | Costlow et al. | |
| 2007/0088769 A1 | 4/2007 | Pace et al. | |
| 2011/0282839 A1* | 11/2011 | Paksoy | G06F 11/1451 707/640 |
| 2013/0066838 A1 | 3/2013 | Singla et al. | |
| 2015/0347260 A1* | 12/2015 | Eckert | G06F 11/34 718/100 |
| 2017/0286463 A1* | 10/2017 | Witt | G06F 16/188 |

OTHER PUBLICATIONS

IBM, z/OS Basic Skills Information Center, "z/OS Concepts," 2010, pp. 1-120, Retrieved From https://www.ibm.com/support/knowledgecenter/zosbasics/com.ibm.zos.zconcepts/zconcepts_172.htm.

IBM Library Server, "1.0 Introduction to Catalogs," 2011, pp. 1, Retrieved From, http://publibz.boulder.ibm.com/cgi-bin/bookmgr_OS390/BOOKS/dgt2c191/1.0?SHELF=all13be9&DT=20120124143550.

IBM, "The Basic Catalog Structure (BCS)," Apr. 6, 2017, pp. 1, Retrieved From https://www.ibm.com/support/knowledgecenter/SSLTBW_2.2.0/com.ibm.zos.v2r2.idac100/c1031.htm.

IBM, IBM Knowledge Center, "Integrated Catalog Forward Recovery Utility (ICFRU)," 2014, pp. 1-2, Retrieved From https://www.ibm.com/support/knowledgecenter/SSLTBW_2.1.0/com.ibm.zos.v2r1.idac100/icfru.htm.

Wikipedia, "IBM System Management Facilities," Sep. 23, 2016, pp. 1-3, Retrieved From https://en.wikipedia.org/wiki/IBM_System_Management_Facilities.

IBM, IBM Knowledge Center, "Introduction," Apr. 6, 2016, pp. 1-3, Retrieved From, https://www.ibm.com/support/knowledgecenter/SSLTBW_2.1.0/com.ibm.zos.v2r1.ieag200/intro.htm.

IBM, IBM Knowledge Center, "Introduction," 2012, pp. 1-4, Retrieved From http://publibz.boulder.ibm.com/cgi-bin/bookmgr_OS390/BOOKS/iea2g2c3/1.0?DT=20120924145638.

IBM, IBM developerWorks, "Welcome to DB2 HADR Home Page," Feb. 26, 2015, pp. 1-2, Retrieved From https://www.ibm.com/developerworks/community/wikis/home?lang=en#!/wiki/DB2HADR/page/Welcome.

* cited by examiner

CATALOG BACKUP AND RECOVERY USING LOGICAL MIRRORING

BACKGROUND

The present invention relates to mainframe computing systems, and more specifically, this invention relates to maintaining catalog data sets for mainframe computing systems.

A catalog data set implemented in conjunction with an operating system is a key component of a mainframe computing system. For example, the catalog data set may enable applications that run on the mainframe computing system to find application data. However, the catalog data set may become unavailable or corrupted, and when such breakage occurs, current strategies for recovery take a significant time to implement, and often result in outage time for the mainframe computing system while corrections are made.

SUMMARY

A computer-implemented method according to one embodiment includes intercepting one or more updates made to a catalog data set, storing the one or more updates in an update buffer, retrieving the one or more updates from the update buffer, sequentially applying the one or more updates to a backup catalog data set, identifying a request to replace the catalog data set, and replacing the catalog data set with the backup catalog data set, in response to the request.

According to another embodiment, a computer program product for catalog backup and recovery using logical mirroring comprises a computer readable storage medium having program instructions embodied therewith, wherein the computer readable storage medium is not a transitory signal per se, and where the program instructions are executable by a processor to cause the processor to perform a method comprising intercepting one or more updates made to a catalog data set, utilizing the processor, storing the one or more updates in an update buffer, utilizing the processor, retrieving the one or more updates from the update buffer, utilizing the processor, sequentially applying the one or more updates to a backup catalog data set, utilizing the processor, identifying a request to replace the catalog data set, utilizing the processor, and replacing the catalog data set with the backup catalog data set, in response to the request, utilizing the processor.

A system according to another embodiment includes a processor, and logic integrated with the processor, executable by the processor, or integrated with and executable by the processor, where the logic is configured to intercept one or more updates made to a catalog data set, store the one or more updates in an update buffer, retrieve the one or more updates from the update buffer, sequentially apply the one or more updates to a backup catalog data set, identify a request to replace the catalog data set, and replace the catalog data set with the backup catalog data set, in response to the request.

Other aspects and embodiments of the present invention will become apparent from the following detailed description, which, when taken in conjunction with the drawings, illustrate by way of example the principles of the invention.

DETAILED DESCRIPTION

Figure 1:
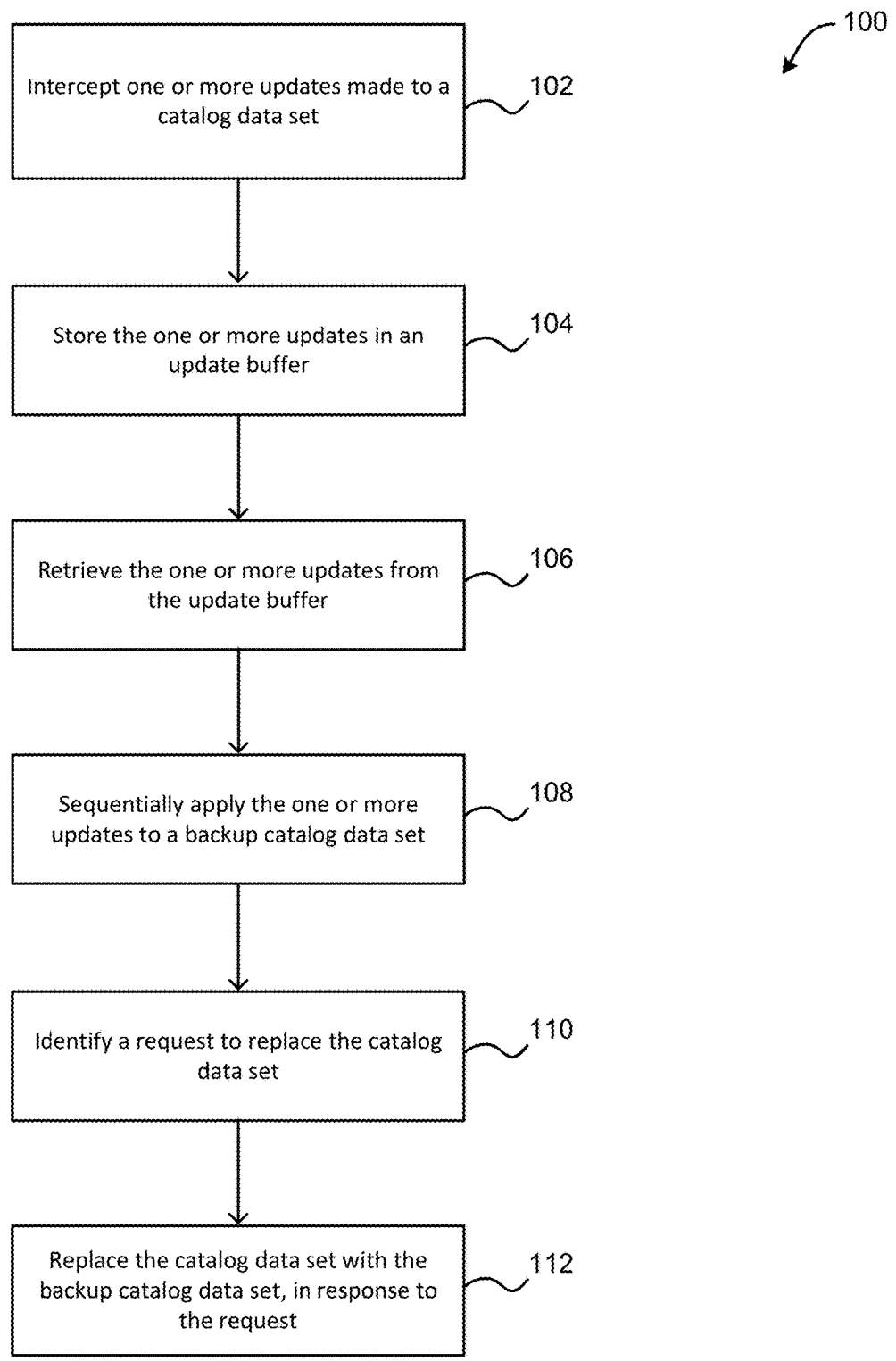
FIG. 1 illustrates a method for catalog backup and recovery using logical mirroring, in accordance with one embodiment.

The following description discloses several preferred embodiments of systems, methods and computer program products for catalog backup and recovery using logical mirroring. Various embodiments provide a method to intercept catalog data set updates and sequentially apply them to a backup catalog data set.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for catalog backup and recovery using logical mirroring.

In one general embodiment, a computer-implemented method includes intercepting one or more updates made to a catalog data set, storing the one or more updates in an update buffer, retrieving the one or more updates from the update buffer, sequentially applying the one or more updates to a backup catalog data set, identifying a request to replace the catalog data set, and replacing the catalog data set with the backup catalog data set, in response to the request.

In another general embodiment, a computer program product for catalog backup and recovery using logical mirroring comprises a computer readable storage medium having program instructions embodied therewith, wherein the computer readable storage medium is not a transitory signal per se, and where the program instructions are executable by a processor to cause the processor to perform a method comprising intercepting one or more updates made to a catalog data set, utilizing the processor, storing the one or more updates in an update buffer, utilizing the processor, retrieving the one or more updates from the update buffer, utilizing the processor, sequentially applying the one or more updates to a backup catalog data set, utilizing the processor, identifying a request to replace the catalog data set, utilizing the processor, and replacing the catalog data set with the backup catalog data set, in response to the request, utilizing the processor.

In another general embodiment, a system includes a processor, and logic integrated with the processor, executable by the processor, or integrated with and executable by the processor, where the logic is configured to intercept one or more updates made to a catalog data set, store the one or more updates in an update buffer, retrieve the one or more updates from the update buffer, sequentially apply the one or more updates to a backup catalog data set, identify a request to replace the catalog data set, and replace the catalog data set with the backup catalog data set, in response to the request.

Referring to FIG. 1, a flowchart of a method 100 is shown according to one embodiment. The method 100 may be performed in accordance with the present invention in any of the environments depicted in FIGS. 3-5, among others, in various embodiments. Of course, more or less operations than those specifically described in FIG. 1 may be included in method 100, as would be understood by one of skill in the art upon reading the present descriptions.

Each of the steps of the method 100 may be performed by any suitable component of the operating environment. For example, in various embodiments, the method 100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 1, method 100 may initiate with operation 102, where one or more updates made to a catalog data set are intercepted. In one embodiment, the catalog data set may include a plurality of files (e.g., basic catalog structure (BCS) catalogs, etc.) within a mainframe computing system. In another embodiment, the mainframe computing system may include a plurality of different volumes (e.g., data storage such as hard disk drives, solid state drives, flash memory drives, etc.). In yet another embodiment, the mainframe computing system may utilize an operating system (e.g., z/OS, etc.). In still another embodiment, the plurality of files within the catalog data set may be used to find data (e.g., application data sets, etc.) on different volumes within the system.

Additionally, in one embodiment, the updates may each include a system management facility (SMF) record. For example, a catalog component of the mainframe computing system may make one or more changes to a catalog record (e.g., one of the plurality of files) within the catalog data set. In another example, the one or more changes may be applied to the catalog data set. In yet another example, the SMF application may then be invoked to record the one or more changes. In another embodiment, the SMF may record the changes as the SMF record. For instance, the SMF record may include a SMF type 61 if the changes include an insert action, the SMF record may include a SMF type 65 if the changes include a delete action, the SMF record may include a SMF type 66 if the changes include an update action, etc.

Further, in one embodiment, the one or more updates may be intercepted utilizing hooking. For example, a program hook may retrieve the created SMF record from an SMF Exit routine. In another example, the SMF Exit routine may include a means by which custom code (in this case, the hook) is executed within the normal execution of the SMF application. In another embodiment, the program hook may also identify the files being updated within the catalog data set.

Further still, method 100 may proceed with operation 104, where the one or more updates are stored in an update buffer. In one embodiment, the update buffer may include a catalog update buffer. In another embodiment, the update buffer may be located within a coupling facility of the mainframe computing system. In yet another embodiment, the one or more updates may be stored sequentially within the update buffer. For example, this may result in a sequential list of updates. In this way, buffering may prevent the one or more updates from being lost.

Also, in one embodiment, a single update buffer may be maintained across a plurality of different systems. For example, SMF Exit routines from multiple different systems may provide updates for their associated catalog data set. These updates may be written to a single update buffer.

In addition, method 100 may proceed with operation 106, where the one or more updates are retrieved from the update buffer. In one embodiment, the retrieving may include sequentially reading the one or more updates from the update buffer. For example, the one or more updates may be read from the update buffer in the order in which they were received into the buffer.

Furthermore, method 100 may proceed with operation 108, where the one or more updates are sequentially applied to a backup catalog data set. In one embodiment, the backup catalog data set may include a copy of the catalog data set. For example, the backup catalog data set may include the same plurality of files as the catalog data set. In another embodiment, the backup catalog data set may include a logically mirrored copy of the catalog data set. For example, sequentially applying the one or more updates to the backup catalog data set may enable the backup catalog data set to logically mirror the catalog data set.

Further still, method 100 may proceed with operation 110, where a request to replace the catalog data set is identified. In one embodiment, the request may be sent in response to a determination that the catalog data set is not available, is corrupt, etc. For example, the catalog data set may become corrupt as a result of user error, code defect, etc. In another embodiment, the request may include a SWAP command. For example, the SWAP command may be sent automatically in response to predefined criteria, or manually by a user.

Also, method 100 may proceed with operation 112, where the catalog data set is replaced with the backup catalog data set, in response to the request. In one embodiment, replacing the catalog data set with the backup catalog data set may include modifying one or more control blocks within a catalog address space of the mainframe computing system to change references from the catalog data set to the backup catalog data set. In another embodiment, replacing the catalog data set with the backup catalog data set may utilize a dynamic device reconfiguration (DDR) Swap interface for mirrored volume switching. For example, the interface may be used to direct updates to the backup catalog data set.

Additionally, in one embodiment, the backup catalog data set may be scanned (e.g., to confirm an integrity of the backup catalog data set, etc.). In another embodiment, the scanning may be performed prior to the replacing. For example, the catalog data set may be replaced with the backup catalog data set in response to a confirmation of the integrity of the backup catalog data set.

In this way, the backup catalog data set may be used by applications to find application data within a mainframe computing system. Additionally, the catalog data set may be replaced with the backup catalog data set without any mainframe computing system down time.

Figure 2:
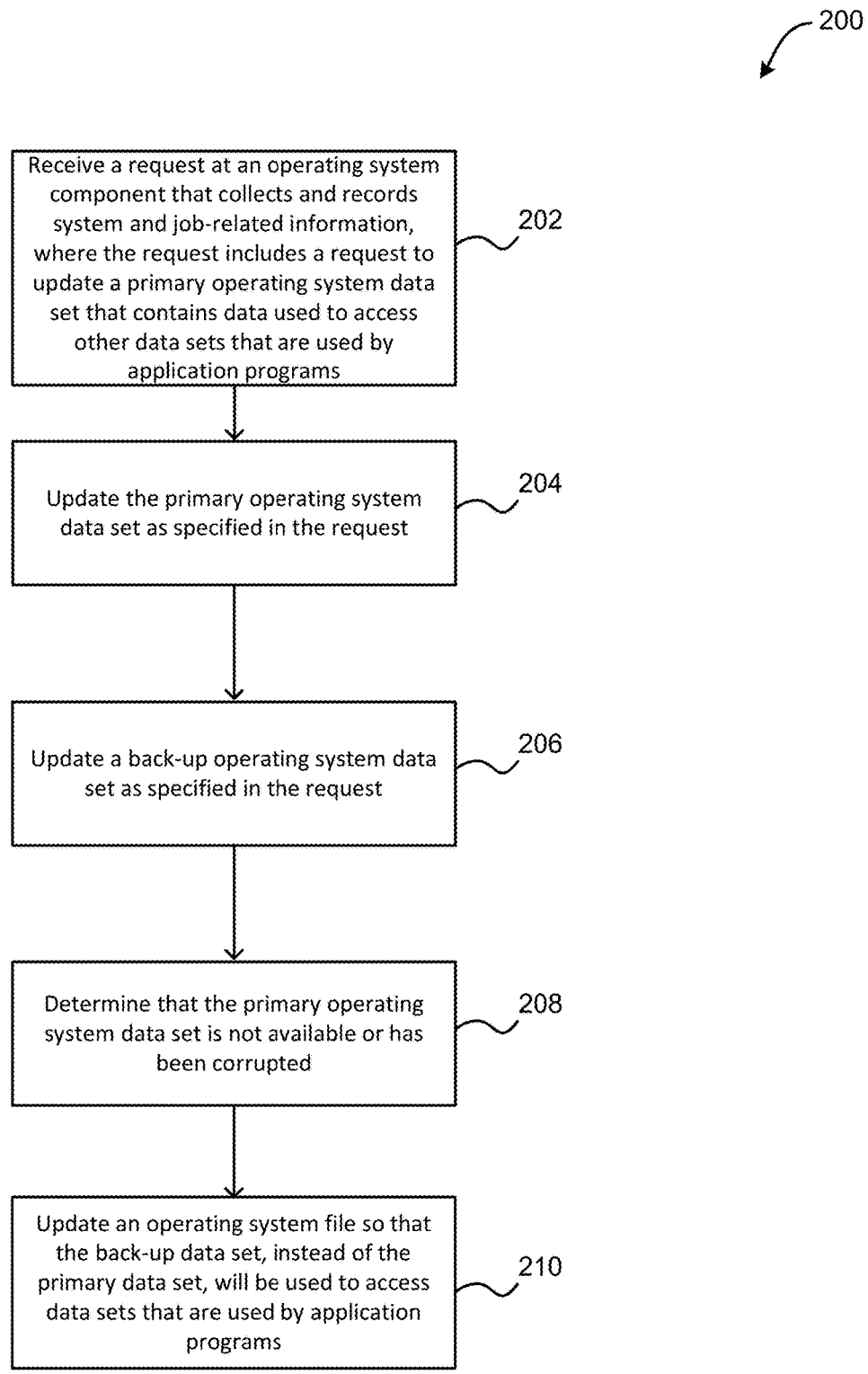
FIG. 2 illustrates a method for updating an operating system file, in accordance with one embodiment.

Now referring to FIG. 2, a flowchart of a method 200 for updating an operating system file is shown according to one embodiment. The method 200 may be performed in accordance with the present invention in any of the environments depicted in FIGS. 3-5, among others, in various embodiments. Of course, more or less operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 may initiate with operation 202, where a request is received at an operating system component that collects and records system and job-related information, where the request includes a request to update a primary operating system data set that contains data used to access other data sets that are used by application programs.

Additionally, method 200 may proceed with operation 204, where the primary operating system data set is updated as specified in the request. Further, method 200 may proceed with operation 206, where a back-up operating system data set is updated as specified in the request. Further still, method 200 may proceed with operation 208, where it is determined that the primary operating system data set is not available or has been corrupted. Also, method 200 may proceed with operation 210, where an operating system file is updated so that the back-up data set, instead of the primary data set, will be used to access data sets that are used by application programs.

Furthermore, in one embodiment, a request is received at the operating system, the request including a request by an application program to access an entry in a data set. In another embodiment, in response to the request, the backup catalog is used to determine which of a plurality of volumes in the data set contains that entry.

Catalog Data Sets

A catalog may include a set of files used by a mainframe operating system (e.g., z/OS, etc.) to describe one or more data set attributes and indicate the volumes on which a data set is located, where a data set is a set of data that is used by an application. For example, z/OS may have multiple catalogs, each of which stores the metadata for various data files. When the mainframe computing system is going to access a specific data file, the catalog may be used to determine which storage device (e.g., volume, etc.) that data file is located on.

The catalog subcomponent of z/OS may be the back bone of the system. It may rely on a series of files called Basic Catalog Structure (BCS) catalogs to provide applications with the ability to find application data. On occasion, the catalog may become corrupted, such as due to user error or defects in the code. It may then be necessary to use a backup, or if there is no up-to-date backup, to recreate the catalog.

In one embodiment, a system management facility (SMF), which contains images of the catalog records, may be used. For example, the SMF may provide a standardized method for writing out records of activity to a file (or data set, to use the z/OS term). The SMF may provide full instrumentation of all baseline activities running on that mainframe operating system, including input/output (I/O), network activity, software usage, error conditions, processor utilization, etc.

Logically Mirrored Catalog Data Set

Instead of using SMF records and a point in time back-up catalog, a logically mirrored copy of a BCS catalog data set may be used as a backup. Unlike physical volume mirroring, in-flight catalog updates may be intercepted and applied logically to a back-up catalog, which may maintain the back-up in real time. Whereas physical mirroring may include a direct bit for bit copy of a catalog as it physically exists on the storage device, logical mirroring may include applying identical record updates to the catalog data set (where if a bit for bit comparison was made between the real copy and the backup, they may not be identical, and may be organized and presented differently).

In one embodiment, logical mirroring may be performed by monitoring local SMF exit routines and utilizing a new single processing application, which may be located in the parallel sysplex, where many systems share a single catalog. In another embodiment, the coupling facility may be used, where the coupling facility may be thought of as a shared cache in which case a parallel sysplex may be used from that standpoint as well.

Exemplary Implementation

According to exemplary z/OS processes, when the catalog component (e.g., z/OS code that maintains the catalog) creates an update to a catalog record, it may apply that change to the BCS data set and may then invoke SMF to record that action. The catalog may write an updated version of the record to the catalog data set. Once it receives indication that this update was written successfully, it may record the action in a SMF, which may include different types of records (e.g., an insert action may be recorded in a 61 type, a delete action may be recorded in a 65 type, an alter action may be recorded in a 66 type, etc.).

In one embodiment, an application may hook into the SMF Exit to identify the catalog being updated and to get a copy of the updated record. For example, exits may be provided by SMF. An exit may include a way to have custom code executed within the normal execution of the SMF application. In another example, custom code may be supplied that may be invoked as an exit routine so that relevant records may be extracted as they are being processed by SMF.

In another embodiment, the copy of this record may be sent to a coupling facility in which a catalog update buffer is maintained across the systems. In yet another embodiment, the catalog update buffer may be placed in the coupling facility. This may achieve improved performance, as opposed to writing it in a common file (this may be similar to a laptop using RAM instead of the hard drive).

With each system's SMF Exit writing to this buffer, a sequential list of catalog updated records may be created. Reads may be performed from this list of updates, and the updates may be sequentially applied to a back-up catalog data set. The updates may be buffered to avoid the danger of losing updates. In case of heavy production periods, the application may handle updates being made by multiple systems to multiple backup catalogs.

Upon determining a need for a backup copy to the catalog data set, a client may be able to issue a SWAP command to an application to seamlessly swap the back-up catalog in for the production catalog. In one embodiment, the control blocks within each system's catalog address space may then be modified to change references from the old catalog device to the new catalog device. This may use an already available z/OS interface known as DDR Swap, which was previously used for mirrored volume switching, to direct updates to the logically mirrored device containing the back-up catalog. In another embodiment, the catalog may also be scanned for integrity to ensure there are no problems with the back-up prior to engaging the swap.

Figure 3:
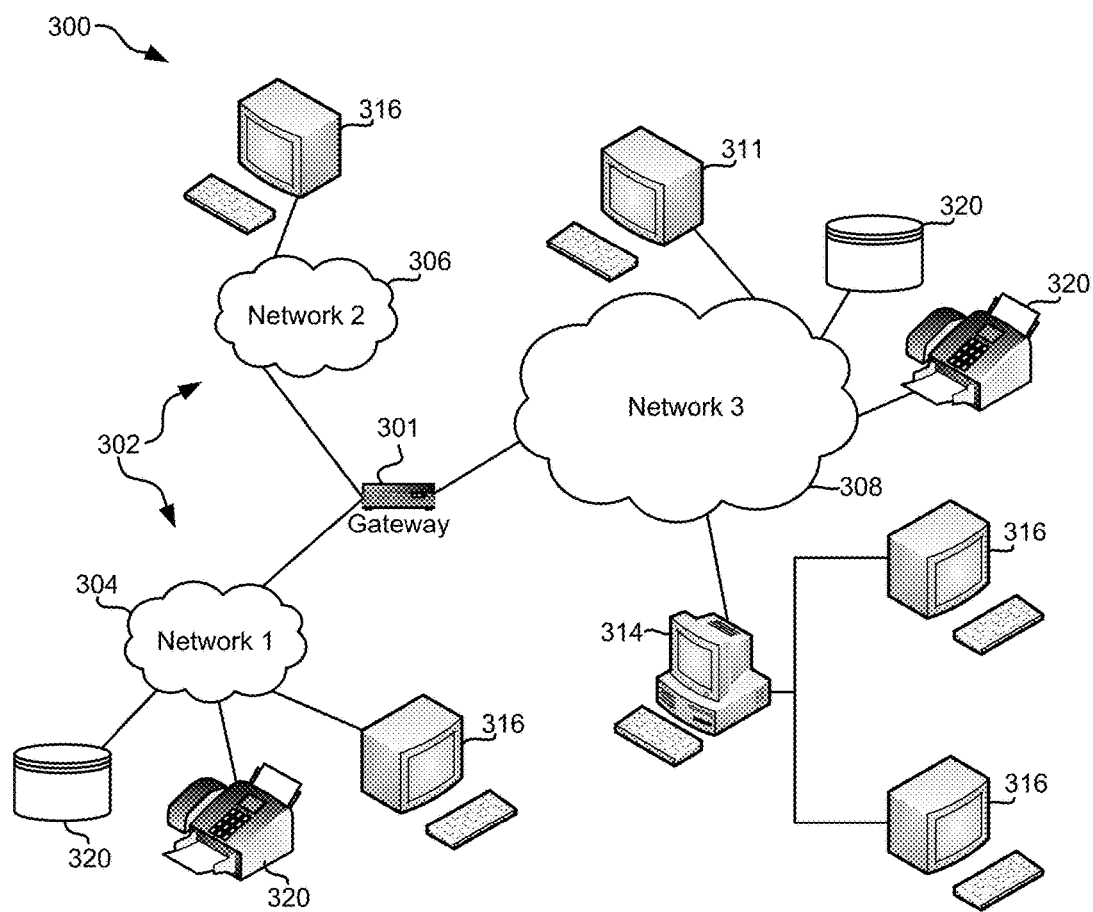
FIG. 3 illustrates a network architecture, in accordance with one embodiment.

FIG. 3 illustrates an architecture 300, in accordance with one embodiment. As shown in FIG. 3, a plurality of remote networks 302 are provided including a first remote network 304 and a second remote network 306. A gateway 301 may be coupled between the remote networks 302 and a proximate network 308. In the context of the present architecture 300, the networks 304, 306 may each take any form including, but not limited to a LAN, a WAN such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, and which is accessible from the remote networks 302 via the gateway 301. It should be noted that the data server(s) 314 may include any type of computing device/groupware. Coupled to each data server 314 is a plurality of user devices 316. User devices 316 may also be connected directly through one of the networks 304, 306, 308. Such user devices 316 may include a desktop computer, lap-top computer, hand-held computer, printer or any other type of logic. It should be noted that a user device 311 may also be directly coupled to any of the networks, in one embodiment.

A peripheral 320 or series of peripherals 320, e.g., facsimile machines, printers, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 304, 306, 308, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 4:
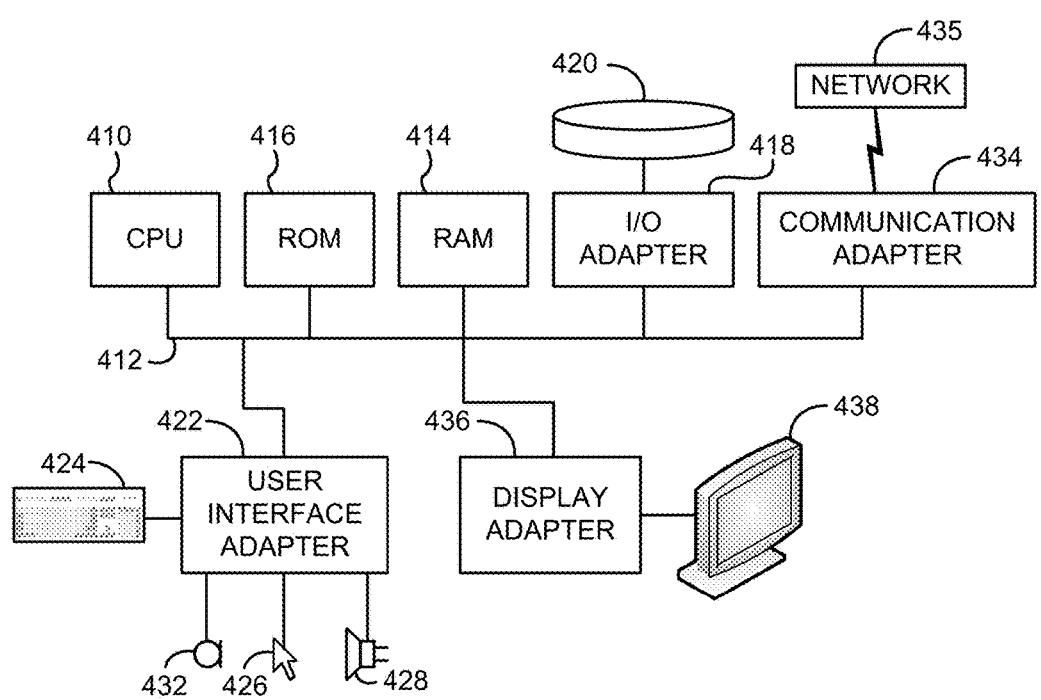
FIG. 4 shows a representative hardware environment that may be associated with the servers and/or clients of FIG. 3, in accordance with one embodiment.

FIG. 4 shows a representative hardware environment associated with a user device 316 and/or server 314 of FIG. 3, in accordance with one embodiment. Such figure illustrates a typical hardware configuration of a workstation having a central processing unit 410, such as a microprocessor, and a number of other units interconnected via a system bus 412.

The workstation shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen and a digital camera (not shown) to the bus 412, communication adapter 434 for connecting the workstation to a communication network 435 (e.g., a data processing network) and a display adapter 436 for connecting the bus 412 to a display device 438.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 5:
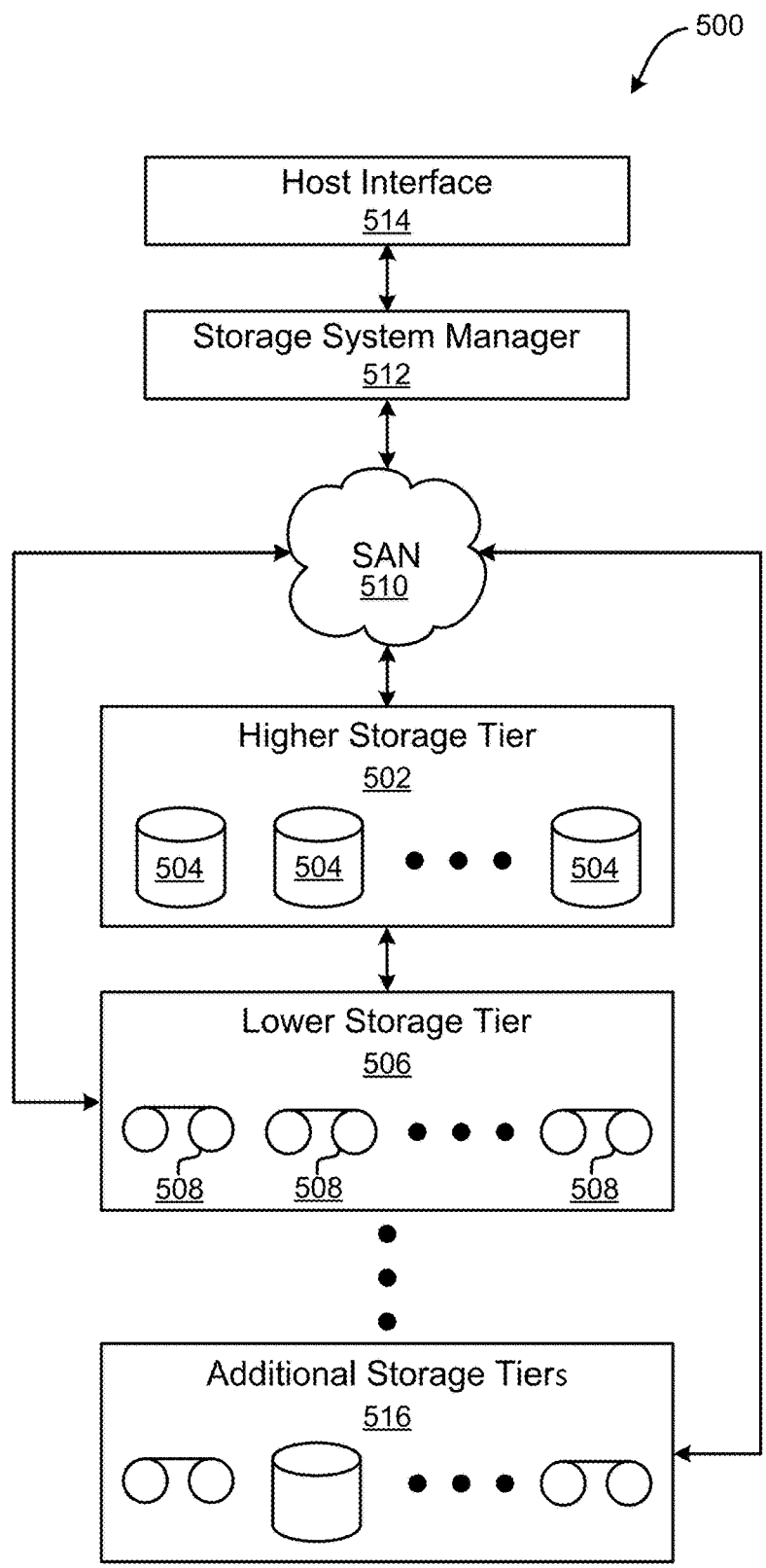
FIG. 5 illustrates a tiered data storage system in accordance with one embodiment.

Now referring to FIG. 5, a storage system 500 is shown according to one embodiment. Note that some of the elements shown in FIG. 5 may be implemented as hardware and/or software, according to various embodiments. The storage system 500 may include a storage system manager 512 for communicating with a plurality of media on at least one higher storage tier 502 and at least one lower storage tier 506. The higher storage tier(s) 502 preferably may include one or more random access and/or direct access media 504, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 506 may preferably include one or more lower performing storage media 508, including sequential access media such as magnetic tape in tape drives and/or optical media, slower accessing HDDs, slower accessing SSDs, etc., and/or others noted herein or known in the art. One or more additional storage tiers 516 may include any combination of storage memory media as desired by a designer of the system 500. Also, any of the higher storage tiers 502 and/or the lower storage tiers 506 may include some combination of storage devices and/or storage media.

The storage system manager 512 may communicate with the storage media 504, 508 on the higher storage tier(s) 502 and lower storage tier(s) 506 through a network 510, such as a storage area network (SAN), as shown in FIG. 5, or some other suitable network type. The storage system manager 512 may also communicate with one or more host systems (not shown) through a host interface 514, which may or may not be a part of the storage system manager 512. The storage system manager 512 and/or any other component of the storage system 500 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 500 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 502, may include a majority of SSD storage media for storing data in a higher performing storage environment, and remaining storage tiers, including lower storage tier 506 and additional storage tiers 516 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 502, while data not having one of these attributes may be stored to the additional storage tiers 516, including lower storage tier 506. Of course, one of skill in the art, upon reading the present descriptions, may devise many other combinations of storage media types to implement into different storage schemes, according to the embodiments presented herein.

According to some embodiments, the storage system (such as 500) may include logic configured to receive a request to open a data set, logic configured to determine if the requested data set is stored to a lower storage tier 506 of a tiered data storage system 500 in multiple associated portions, logic configured to move each associated portion of the requested data set to a higher storage tier 502 of the tiered data storage system 500, and logic configured to assemble the requested data set on the higher storage tier 502 of the tiered data storage system 500 from the associated portions.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   intercepting one or more updates made to a catalog data set, where:
      each of the one or more updates includes a system management facility (SMF) record, and
      the one or more updates are intercepted utilizing a program hook that retrieves the one or more updates from an SMF Exit routine;
   storing the one or more updates sequentially within an update buffer;
   retrieving the one or more updates from the update buffer, including sequentially reading the one or more updates from the update buffer;
   sequentially applying the one or more updates to a backup catalog data set, the backup catalog data set including a logically mirrored copy of a catalog data set;
   identifying a request to replace the catalog data set; and
   replacing the catalog data set with the backup catalog data set, in response to the request including:
      scanning the backup catalog data set to confirm an integrity of the backup catalog data set,
      in response to a confirmation of the integrity of the backup catalog data set, modifying one or more control blocks within a catalog address space of a mainframe computing system to change references from the catalog data set to the backup catalog data set;
   wherein replacing the catalog data set with the backup catalog data set utilizes a dynamic device reconfiguration (DDR) Swap interface for mirrored volume switching to direct updates to the backup catalog data set.

2. The computer-implemented method of claim 1, wherein the catalog data includes a plurality of basic catalog structure (BCS) catalogs within the mainframe computing system.

3. The computer-implemented method of claim 1, wherein the catalog data set includes a set of files used by the mainframe computing system to describe one or more data set attributes and indicate volumes on which a data set is located, the data set including a set of data that is used by an application.

4. The computer-implemented method of claim 1, wherein the SMF record includes an insert action recorded in a 61 type.

5. The computer-implemented method of claim 1, wherein the SMF record includes a delete action recorded in a 65 type.

6. The computer-implemented method of claim 1, wherein the SMF record includes an alter action recorded in a 66 type.

7. The computer-implemented method of claim 1, wherein the request to replace the catalog data set is sent in response to a determination that the catalog data set is not available or is corrupt.

8. The computer-implemented method of claim 1, wherein:
   the catalog data includes a plurality of basic catalog structure (BCS) catalogs within the mainframe computing system,
   the catalog data set includes a set of files used by the mainframe computing system to describe one or more data set attributes and indicate volumes on which a data set is located, the data set including a set of data that is used by an application, the request to replace the catalog data set is sent in response to a determination that the catalog data set is not available or is corrupt, and the SMF record includes an insert action recorded in a 61 type.

9. A computer program product for catalog backup and recovery using logical mirroring, the computer program product comprising a computer readable storage medium having program instructions embodied therewith, wherein the computer readable storage medium is not a transitory signal per se, the program instructions executable by a processor to cause the processor to perform a method comprising:

intercepting one or more updates made to a catalog data set, utilizing the processor, where:
each of the one or more updates includes a system management facility (SMF) record, and
the one or more updates are intercepted utilizing a program hook that retrieves the one or more updates from an SMF Exit routine;

storing the one or more updates sequentially within an update buffer, utilizing the processor;

retrieving the one or more updates from the update buffer, utilizing the processor including sequentially reading the one or more updates from the update buffer;

sequentially applying the one or more updates to a backup catalog data set, utilizing the processor, the backup catalog data set including a logically mirrored copy of a catalog data set;

identifying a request to replace the catalog data set, utilizing the processor; and replacing the catalog data set with the backup catalog data set, in response to the request, utilizing the processor, including:
scanning the backup catalog data set to confirm an integrity of the backup catalog data set,
in response to a confirmation of the integrity of the backup catalog data set, modifying one or more control blocks within a catalog address space of a mainframe computing system to change references from the catalog data set to the backup catalog data set;

wherein replacing the catalog data set with the backup catalog data set utilizes a dynamic device reconfiguration (DDR) Swap interface for mirrored volume switching to direct updates to the backup catalog data set.

10. The computer program product of claim 9, wherein the catalog data includes a plurality of basic catalog structure (BCS) catalogs within the mainframe computing system.

11. The computer program product of claim 9, wherein the catalog data set includes a set of files used by the mainframe computing system to describe one or more data set attributes and indicate volumes on which a data set is located, the data set including a set of data that is used by an application.

12. The computer program product of claim 9, wherein the SMF record includes an insert action recorded in a 61 type.

13. The computer program product of claim 9, wherein the SMF record includes a delete action recorded in a 65 type.

14. The computer program product of claim 9, wherein the SMF record includes an alter action recorded in a 66 type.

15. The computer program product of claim 9, wherein the request to replace the catalog data set is sent in response to a determination that the catalog data set is not available or is corrupt.

16. The computer program product of claim 9, wherein:
the catalog data includes a plurality of basic catalog structure (BCS) catalogs within a mainframe computing system,
the catalog data set includes a set of files used by the mainframe computing system to describe one or more data set attributes and indicate volumes on which a data set is located, the data set including a set of data that is used by an application,
the request to replace the catalog data set is sent in response to a determination that the catalog data set is not available or is corrupt, and
the SMF record includes an insert action recorded in a 61 type.

17. A system, comprising:
a processor; and
logic integrated with the processor, executable by the processor, or integrated with and executable by the processor, the logic being configured to:
intercept one or more updates made to a catalog data set, where:
each of the one or more updates includes a system management facility (SMF) record, and
the one or more updates are intercepted utilizing a program hook that retrieves the one or more updates from an SMF Exit routine;
store the one or more updates sequentially within an update buffer;
retrieve the one or more updates from the update buffer, including sequentially reading the one or more updates from the update buffer;
sequentially apply the one or more updates to a backup catalog data set, the backup catalog data set including a logically mirrored copy of a catalog data set;
identify a request to replace the catalog data set; and
replace the catalog data set with the backup catalog data set, in response to the request including:
scanning the backup catalog data set to confirm an integrity of the backup catalog data set,
in response to a confirmation of the integrity of the backup catalog data set, modifying one or more control blocks within a catalog address space of a mainframe computing system to change references from the catalog data set to the backup catalog data set;
wherein replacing the catalog data set with the backup catalog data set utilizes a dynamic device reconfiguration (DDR) Swap interface for mirrored volume switching to direct updates to the backup catalog data set.

* * * * *